United States Patent
Vaillant

(10) Patent No.: US 7,806,194 B2
(45) Date of Patent: Oct. 5, 2010

(54) MECHANICAL SHOEING FOR HOOF, WHICH IS INTENDED, IN PARTICULAR, FOR SPORT HORSES

(76) Inventor: Joseph Vaillant, 3 rue du Faubourg Saint Nicolas, F-74300 Cluses (FR)

( * ) Notice: Subject to any disclaimer, the term of this patent is extended or adjusted under 35 U.S.C. 154(b) by 602 days.

(21) Appl. No.: 10/592,022

(22) PCT Filed: Mar. 9, 2005

(86) PCT No.: PCT/FR2005/000567
§ 371 (c)(1), (2), (4) Date: Aug. 23, 2007

(87) PCT Pub. No.: WO2005/086998
PCT Pub. Date: Sep. 22, 2005

(65) Prior Publication Data
US 2007/0289750 A1    Dec. 20, 2007

(30) Foreign Application Priority Data
Mar. 9, 2004    (FR) .................................. 04 02429

(51) Int. Cl.
*A01L 3/02* (2006.01)
(52) U.S. Cl. ............................................. 168/24; 168/4
(58) Field of Classification Search .................. 168/4, 168/12, 24, 23, 13, 10
See application file for complete search history.

(56) References Cited

U.S. PATENT DOCUMENTS

| | | | | |
|---|---|---|---|---|
| 48,618 A * | 7/1865 | Custer | ............................ | 168/23 |
| 585,290 A * | 6/1897 | Sheldon | ...................... | 168/13 |
| 643,272 A * | 2/1900 | Paar | ............................ | 168/13 |
| 646,234 A * | 3/1900 | Paar | ............................ | 168/13 |
| 699,373 A * | 5/1902 | Dyson | ......................... | 168/13 |
| 704,175 A * | 7/1902 | Cline | ........................... | 168/13 |
| 706,543 A * | 8/1902 | Fisher | ......................... | 168/13 |
| 741,110 A * | 10/1903 | Cline | ......................... | 168/13 |

(Continued)

FOREIGN PATENT DOCUMENTS

DE    13888    6/1881

(Continued)

*Primary Examiner*—Son T. Nguyen
(74) *Attorney, Agent, or Firm*—Fay Sharpe LLP

(57) ABSTRACT

A mechanical shoeing and, more specifically, a shoe which is intended to be mounted to the hoof of a sport horse that comprises: a front central part (3) or toe piece; two side branches (4 and 5) or quarters which extend freely from each side of the front central part, rear end portions (6 and 7) thereof forming heels; and holes (8, 9, 10, 11, and 12, 13, 14, 15) or nail holes which are defined in the side branches (4 and 5) in order to receive nails for fixing to the hoof (2). Moreover, in plan view, the inner hoof-facing surface (2) of each of the side branches (4 and 5) comprises zones (D and E) which belong to the rear end portions (6, 7) or heels and which are flared and, as well, are wider than the side branches (4, 5). In plan view, the inner face of each of the side branches (4 and 5) of the shoe also comprise a zone (A, B) which has a simple curved inner profile and which is narrowed such as to be narrower than zone C of the front central part (3) or toe piece.

19 Claims, 6 Drawing Sheets

U.S. PATENT DOCUMENTS

| | | | | |
|---|---|---|---|---|
| 768,237 | A * | 8/1904 | Price | 168/13 |
| 776,772 | A * | 12/1904 | Bartley | 168/13 |
| 776,795 | A * | 12/1904 | Peacock et al. | 168/13 |
| 778,909 | A * | 1/1905 | Simmons | 168/13 |
| 779,757 | A * | 1/1905 | Bartley | 168/13 |
| 856,261 | A * | 6/1907 | Kiley | 168/13 |
| 903,759 | A * | 11/1908 | Paar | 168/13 |
| 1,100,030 | A * | 6/1914 | Sheldon | 168/13 |
| 1,125,556 | A * | 1/1915 | Kent | 168/13 |
| 1,497,820 | A * | 6/1924 | Wiestner | 168/13 |
| 2,067,427 | A * | 1/1937 | Swanstrom | 168/13 |
| 4,235,292 | A * | 11/1980 | Dallmer | 168/4 |
| 5,740,866 | A | 4/1998 | Bergström et al. | 168/12 |
| 6,082,462 | A * | 7/2000 | Lyden | 168/24 |
| 2002/0023760 | A1* | 2/2002 | Bergeleen | 168/4 |
| 2005/0236165 | A1* | 10/2005 | Yates et al. | 168/4 |

FOREIGN PATENT DOCUMENTS

| | | |
|---|---|---|
| DE | 35 17 514 C2 | 11/1986 |
| DE | 44 45 938 | 6/1996 |
| FR | 2526630 | 11/1983 |
| WO | WO 99/40782 | 8/1999 |

\* cited by examiner

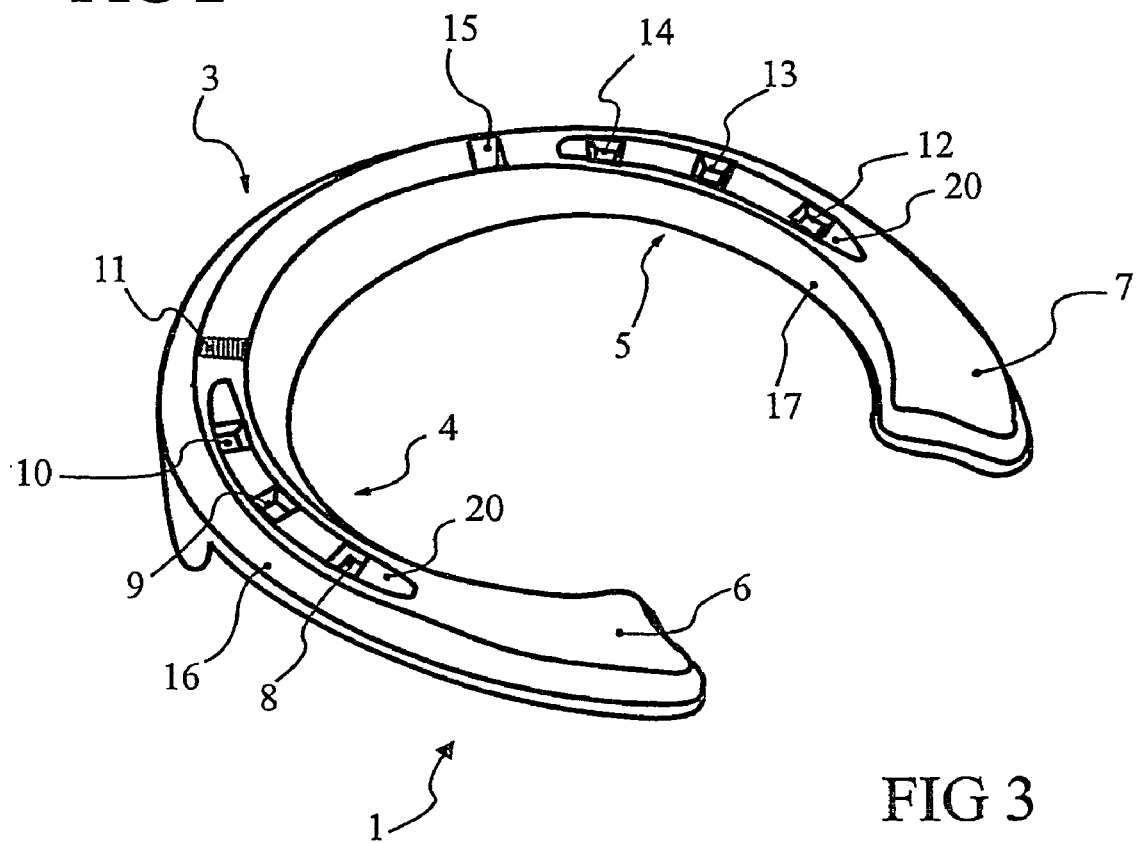
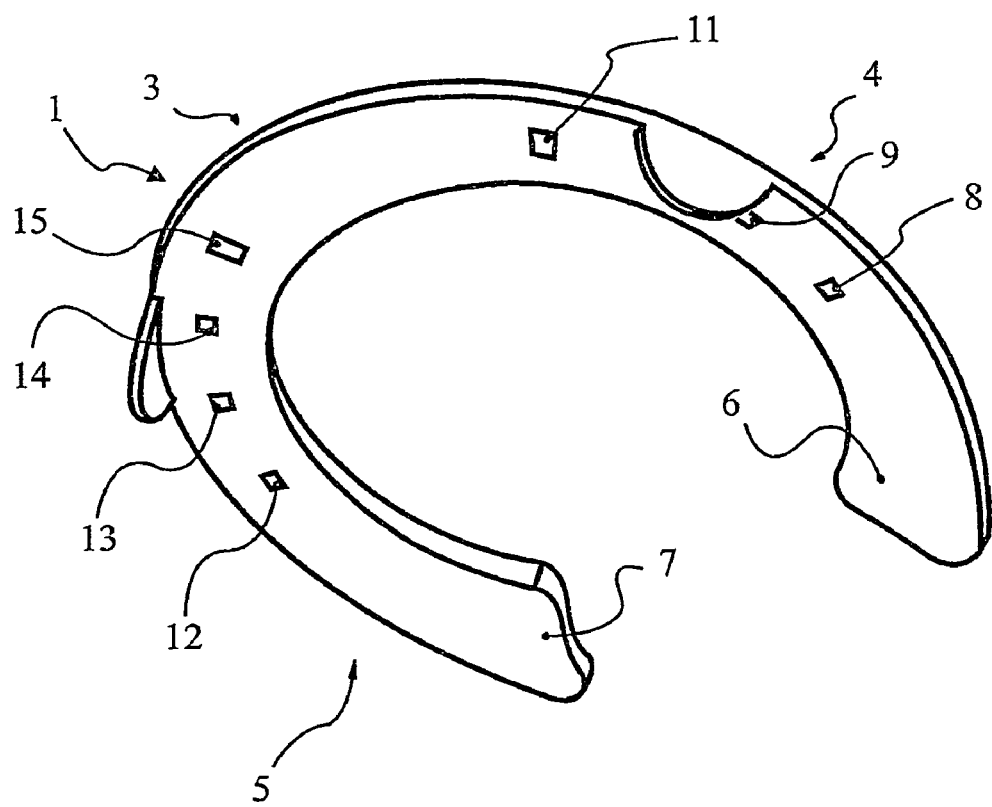

MECHANICAL SHOEING FOR HOOF, WHICH IS INTENDED, IN PARTICULAR, FOR SPORT HORSES

BACKGROUND

The present invention concerns a mechanical shoeing intended to be mounted on the hoof of an equine in general, but more particularly of a sport horse.

Indeed, the shoed feet of sport horses are generally subjected to very strong demands due to the weight of the iron and the various overloads due to the lack of mobility of the shoed foot, causing serious muscular, tendon, and joint lesions:

- overloads due to the lengthening of the lever arm in the phase of the departure of the foot,
- overloads of the heels in the phase of placing down the foot and absorbing impact,
- overloads due to rough displacement in the phase of side displacement while turning, because of hardness of the course becoming increasingly more marked with tracks.

One finds in the prior art some solutions which propose to separately solve one or the other of the problems stated while omitting to solve the others, which are very often not the least.

This causes in the long run concerns with a general balance of the foot. It follows naturally of the problems of lameness, and a strongly reduced sporting career for equines.

SUMMARY

The purpose of the invention is thus to solve all of the above mentioned problems, without requiring a major change on the part of the shoeing smith, apart from working the shape for the foot concerned, in order to join in the same standard product all the performance while improving the comfort, the protection, and the mobility of the shoed foot.

To this end, the invention concerns a mechanical shoe intended to be mounted more particularly on the hoof of a sport horse, of the type formed by a central front part or toe piece, from both sides of which two side branches or quarters extend freely, the rear parts of which form heels, holes or nail holes being defined in the aforementioned side branches, in order to receive nails for fixing it on the hoof, which, in plan view, presents on its inner, hoof-facing surface, of each of the side branches includes zones which belong to the rear end parts or heels, and forming flares which are wider than the side branches, characterized in that it also presents, in the plan view, on the internal face, on each of its side branches a zone whose interior line presents a simple curved inner profile and whose width is narrower than the zone of the front central part or toe piece.

A shoe thus obtained replaces the family of shoes traditionally known on the market and can be mounted in place of those, which are metal or out of synthetic matter, obtained by forging, machining or molding solid, liquid, or pulverized matter The present invention relates equally to the characteristics which will arise during the description which will follow, and which will need to be considered separately or according to all their possible technical combinations.

Still further advantages of the present invention will be appreciated to those of ordinary skill in the art upon reading and understand the following detailed description.

BRIEF DESCRIPTION OF THE DRAWINGS

The invention may take form in various components and arrangements of components, and in various steps and arrangements of steps. The drawings are only for purposes of illustrating the preferred embodiments and are not to be construed as limiting the invention.

FIG. 2 is a perspective view of the outer face of the shoe according to FIG. 1, intended to be in contact with the ground.

FIG. 3 is a perspective view of the internal face of the shoe according to FIG. 1, intended to be in contact with the hoof of the horse.

DETAILED DESCRIPTION

Figure 1:
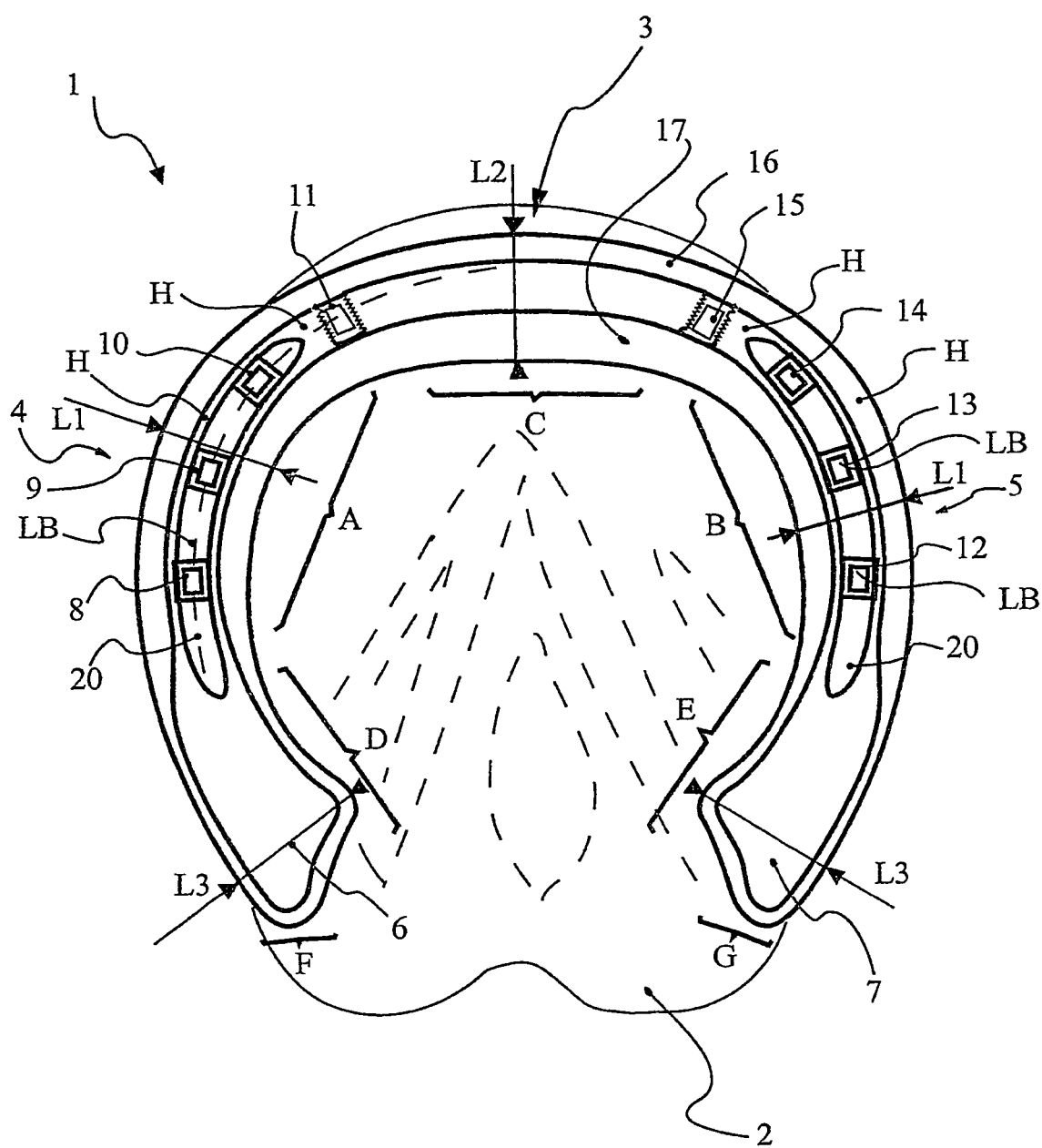
FIG. 1 represents has mechanical shoe according to the invention, in plan view, with the hoof of the horse.
Figure 4:
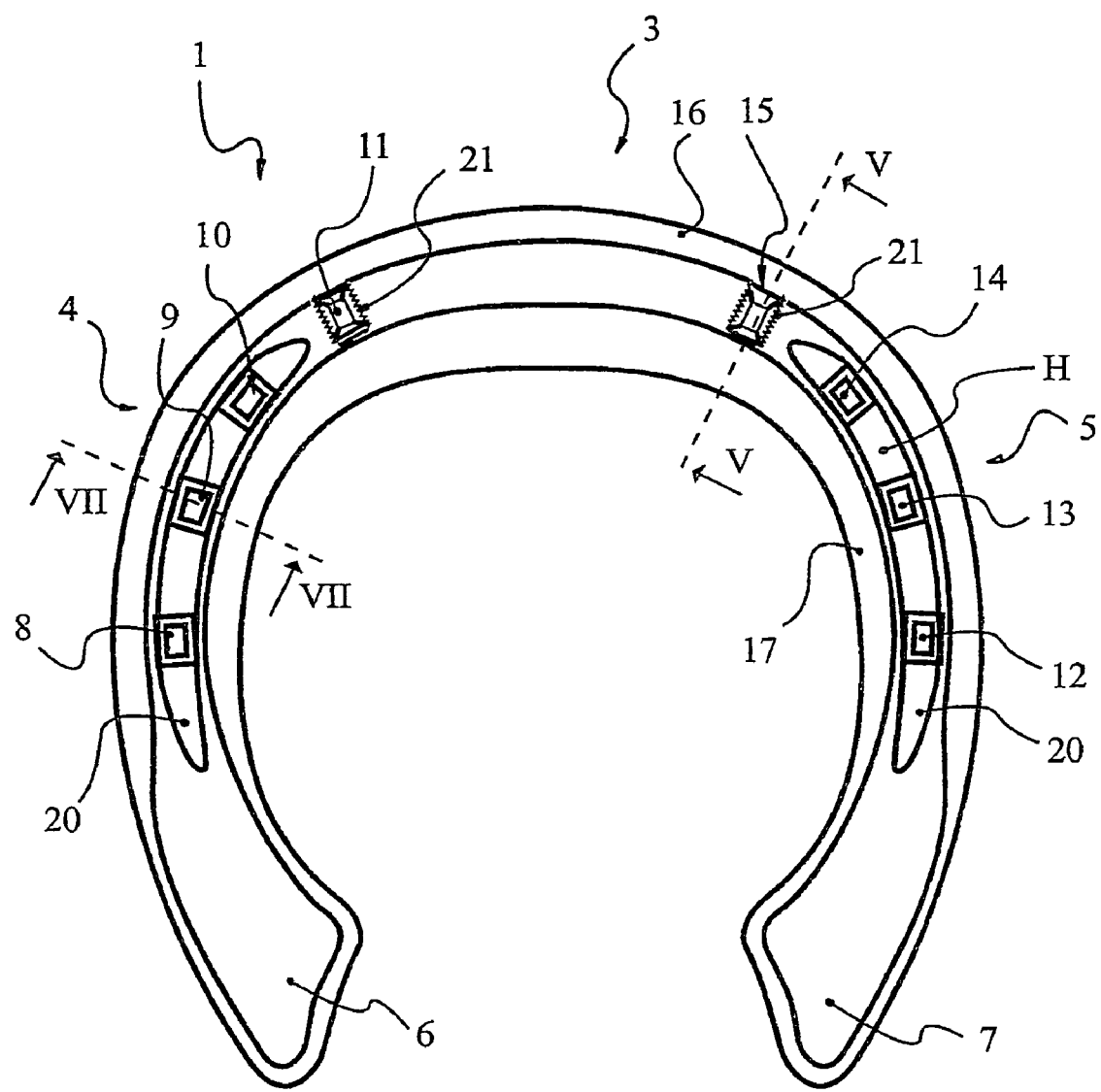
FIG. 4 is in plan view of the exterior face of the shoe, according to FIG. 1, represented only, before its installation.

The mechanical shoe 1 indicated overall in the figures is intended to be mounted, in order to protect the part of a hoof 2 which faces it, called a sole, which is made up of in fact of the tender and fragile parts.

The shoe 1 is formed by a front central part 3 or toe piece from both sides of which freely extend two side parts 4 and 5 or quarters, of which the rear end parts 6 and 7 form the heels.

Holes 8, 9, 10, 11 and 12, 13, 14, 15 or nail holes are defined in the aforementioned quarters 4 and 5 in order to receive the nails (not represented) for fixing it on the hoof 2. These nail holes can be located in a curved grooves 20.

According to the invention, the shoe 1 in plan view presents on its internal hoof-facing surface (FIG. 3) on each of its side branches or quarters 4 and 5, has a zone A, B of reduced width, obtained by a contracting in width compared to the zone C of the wider front central part or toe piece and compared to the zones D and E at the trailing ends 6 and 7 or heels, forming flares of greater width than the quarters 4, 5. Thus, the width L1 of the central zones A, B of the side branches 4, 5 is less than the width L2 of the front part 3 and less than the width L3 of the end portions 6, 7.

As one can also notice in the figures, the end portions 6, 7 or heels present after their flared zone D, E, of new thinning zones F, G disposed towards the outer peripheral edges of the aforesaid heels 6 and 7. According to a different characteristic of the invention, the inner and outer peripheral edges of the shoe 1 are beveled by chamfers 16 and 17 defined in direction of its external face (FIG. 2), so as to define, in plan view, a contact surface H with the ground which has a width narrower than the internal face (FIG. 3) of the aforementioned shoe 1, but substantially constant, on the level of the toe piece 3 extending into the two quarters 4 and 5 extending it, the aforementioned face of contact H widening on the level of the heels 6 and 7.

Figure 8:
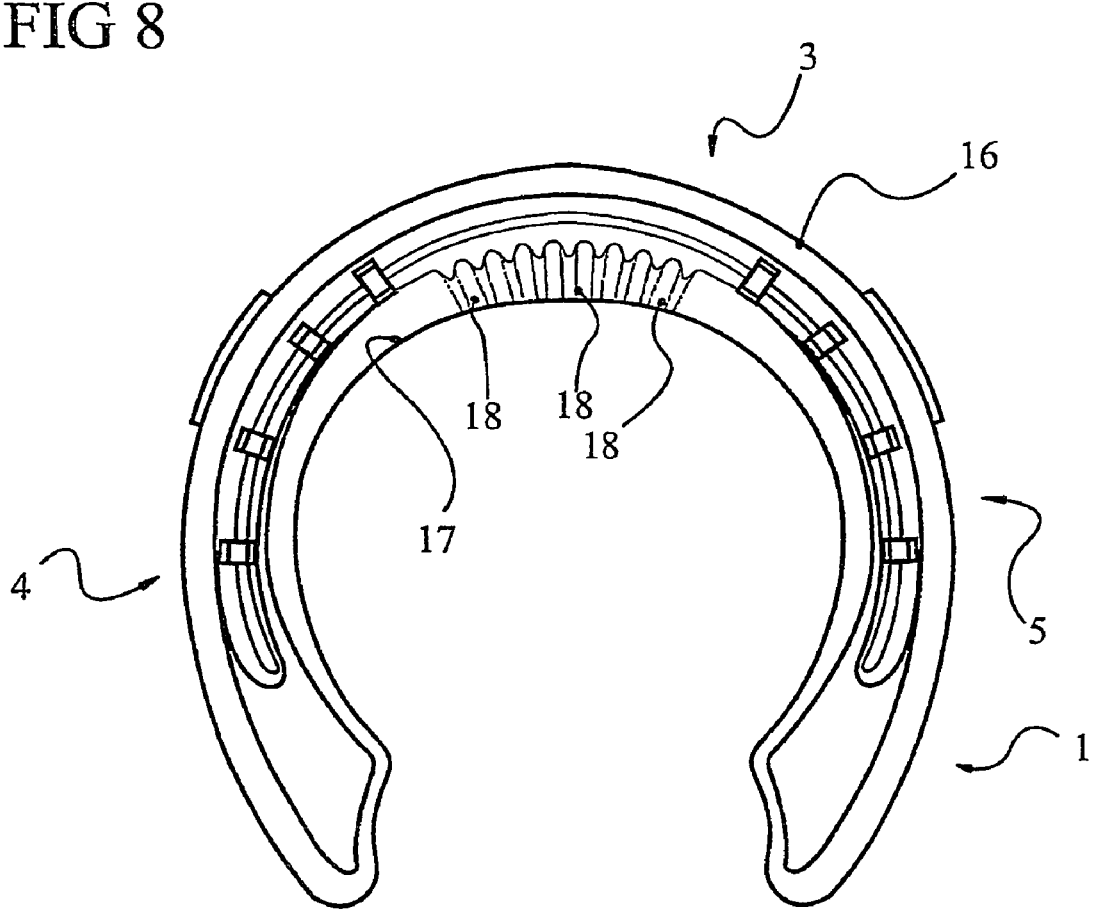
FIGS. 8 and 8a are respectively a plan view and a prospective view of an alternative embodiment of a shoe according to FIG. 1.
Figure 8A:
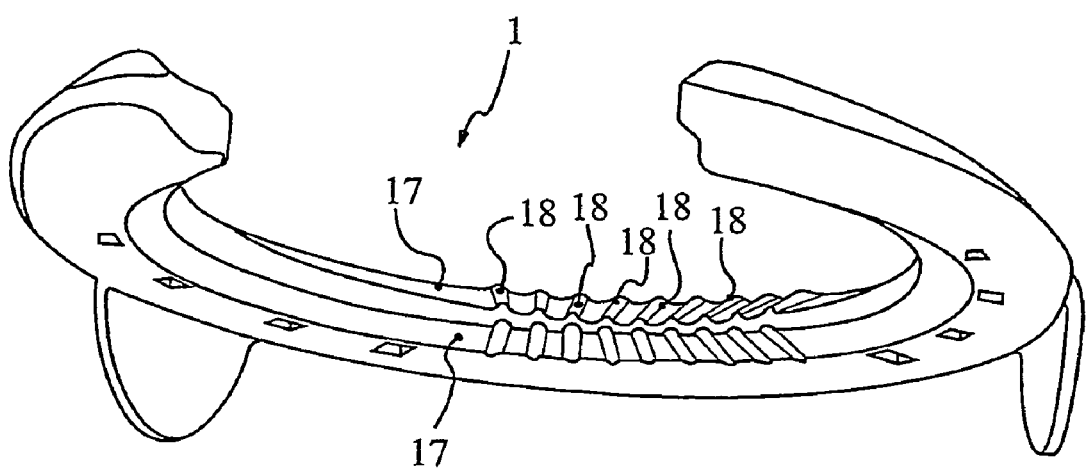
Figure 9:
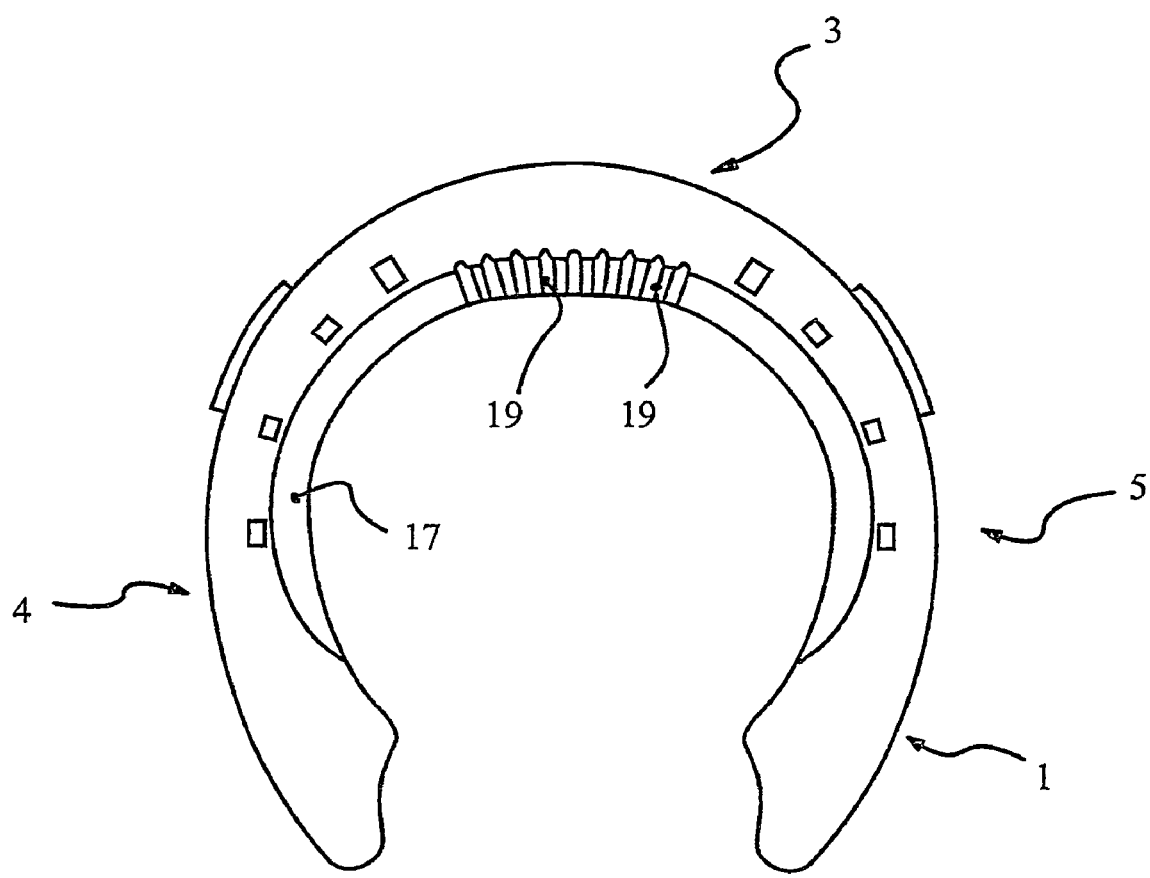
FIG. 9 is also a plan view of a different alternative embodiment of a shoe according to FIG. 1.

Advantageously, the front central part 3 or toe piece presents a plurality of ridges 18 or grooves 19 forming accordion pleats defined along the internal chamfer 17. These ridges 18 (FIGS. 8-8a) or grooves 19 (FIG. 9) permit lateral inflection of the shoe according to the invention, i.e. permit the spacing between the two side branches 4 and 5 to expand and come together under a given stress, up to 25% compared to traditional shoes. This increase will be particularly advantageous in certain movements of the foot of the horse, for example in lateral displacement while turning. Preferably, these ridges 18 or grooves 19 will be manufactured by stamping concurrently with the shoe according to the invention.

Such shoe facilitates its installation with a maximum fit towards the back of the foot. Another advantage of a shoe thus configured is due to the fact that the side branches 4 and 5 have a reduced bearing surface on the ground that will facilitate penetration in the ground in the phase of lateral displacement while turning. This is obtained at the same time by the reduction in width discussed previously, and with the internal and external beveling of the cross-section.

With regard to the heels 6 and 7, being flared according to the invention, it is preferable that this zone is free from grooves in order to allow later drilling and tapping without difficulty, in order to permit the use of screw crampons, used during obstacle jumping contests.

In addition, the advantage obtained by the narrowed zones F, G defined in the extension of the flared zones D, E of the heels 6 and 7, has the advantage of facilitating the placing of the iron on both sides of an extending part of the hoof in this zone, named the fourchette, which also contributes to the weight reduction, as do the bevelings and the variation of width of the cross-section.

According to a different characteristic of the invention, the external face of each of the side branches 4, 5 has on its outer surface a plurality of holes or nail holes 8 to 11 and 12 to 15 intended to receive the nails. These nail holes are advantageously, but not exclusively, arranged in a curved groove 20.

As one can notice in the collection of the figures and according to a different characteristic of the invention, the shoe 1 can have toe pieces 3 or grips, on both sides in zones bordering with the side branches 4, 5, of the nail holes 11, 15 extending transversely in a central zone and the length of which is bigger than the thickness of the blade of the corresponding nail, so as to position this nail in an ideal nailing zone, namely near the white line LB of the hoof 2.

Figure 5:
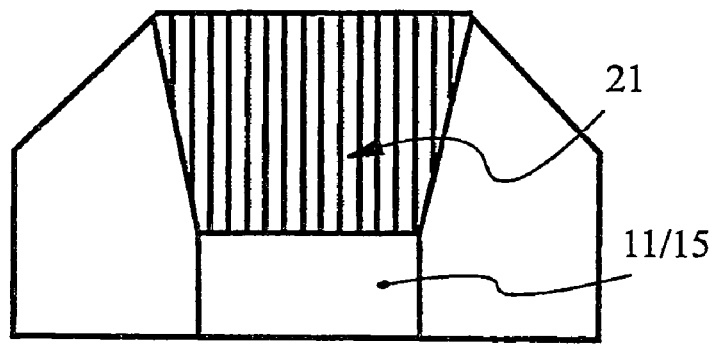
FIG. 5 is a transverse cross-sectional view in enlarged scale of the shoe along a line V.V of FIG. 4.

As FIG. 5 shows particularly well, each of transverse nail holes 11, 15 is, for example, of truncated pyramidal form widening towards the external face of the toe piece 3.

Figure 6:
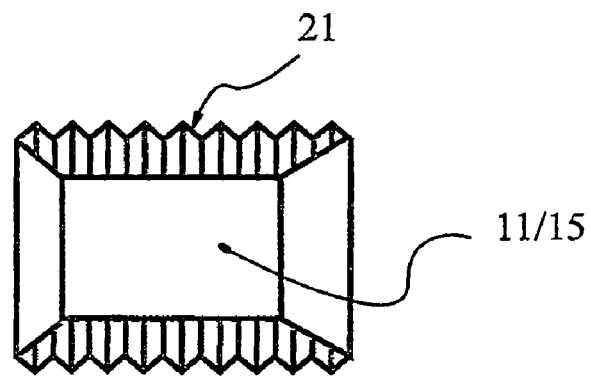
FIG. 6 is a top view in enlarged scale of a transverse nail hole.
Figure 7:
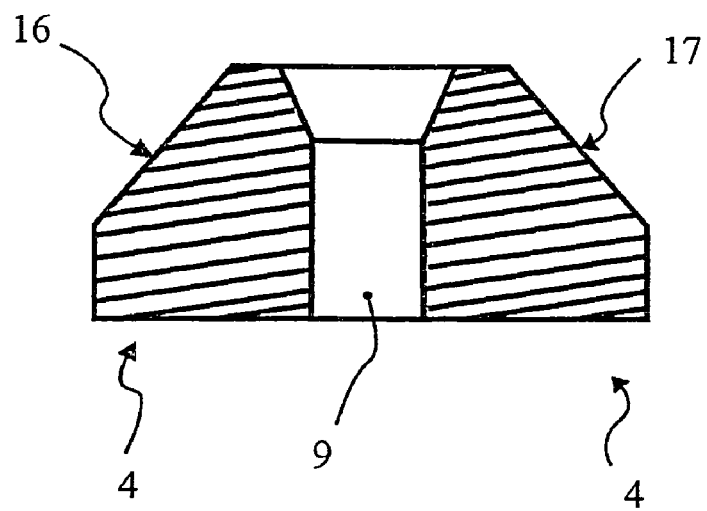
FIG. 7 is a cross-sectional view in enlarged scale along line VII.VII of FIG. 4.

According to a different characteristic of the invention represented in the figures, but more particularly in FIGS. 5 and 6, the inner surfaces of the truncated pyramidal transverse nail holes 11 and 15 includes notches 21, in order to allow locking the nail head in a selected position in nail hole.

It will be added that the inventive shoe facilitates installation with a maximum fit towards the rear of the foot (called a shoe with truncated toe piece). The modification of the shape of the iron in this zone by flattening out of toe piece will facilitate mounting towards the rear of the foot. In order to maintain the possibility of positioning the nail in the ideal nailing zone, namely the white line of the hoof, the punched zone intended to receive the nail, i.e. the nail hole, could have this transverse form (to position the nail as well as possible in the white line) and notched, in order to allow blocking movement of the nail head in the radial direction.

Of course, the invention is not limited to the embodiments described and represented by way of example, but it includes also all the technical equivalents as well as their combinations.

The invention claimed is:

1. A mechanical shoe for mounting on a hoof of a sport horse, comprising:
   a front central part or toe piece,
   two side branches or quarters extending freely from sides of the front central part,
   rear end portions forming heels,
   holes or nail holes defined in the side branches to receive nails for attachment to the hoof,
   an inner surface facing the hoof of each of the side branches including zones on the rear ends, forming flares of greater width than the side branches, the inner surface of each of its side branches defining a zone whose interior edge presents a simple curved inner profile and whose width is narrower than the front central part or toe piece, and
   an inner peripheral edge beveled by a first chamfer defined in a direction of an outer surface which defines a contact face with the ground narrower than the inner surface, the contact face widening in the region of the heels,
   wherein the front central part or toe piece has a plurality of ridges or grooves forming accordion pleats disposed on the first chamfer.

2. The shoe according to claim 1, wherein the rear ends or heels define thinning zones extending from outer peripheral edges of the heels.

3. The shoe according to the claim 1, wherein the inner peripheral edge is beveled by a second chamfer defined in a direction of the inner surface.

4. The shoe according to claim 3, wherein the front central part or toe piece has a plurality of ridges or grooves forming accordion pleats disposed on the second chamfer.

5. The shoe according to claim 3, wherein on both sides of the toe piece, in zones bordering with the side branches, transverse nail holes are defined with a central portion extending transversely and a length bigger than a thickness of a blade of nail to be received, such that the received nail can be positioned in an ideal nailing zone or white line of the hoof.

6. The shoe according to claim 5, wherein each of the transverse nail holes is of truncated pyramidal form widening towards the outer surface of the toe piece.

7. The shoe according to claim 6, wherein inner surfaces of the truncated pyramidal transverse nail holes include notches, in order to allow the blocking of the received nail in a selected position in the nail hole.

8. The shoe according to claim 3, wherein the contact face in the region of the toe piece and the two side branches is of substantially constant width narrower than the inner surface.

9. The shoe according to claim 1, wherein the inner surface of each side branch is flat where the holes intended to receive the nails are defined.

10. The shoe according to claim 9, wherein on the outer face, the nail holes are defined in a groove.

11. A horseshoe comprising:
    a front central portion;
    side branch portions extending from opposite sides of the front central portion;
    the front central portion and each side branch portion having an inner edge beveled by a chamfer in a direction of an outer surface which defines a contact face with the ground;
    the contact face along the side branches being narrower than the contact face along the front central portion; a plurality of ridges or grooves defined on the chamfer forming accordion pleats along the front central portion; and
    heel portions extending from ends of the side branch portions, the heel portions being flared wider than the side branch portions.

12. The horseshoe according to claim 11, wherein the front central and side branch portions have an inner hoof facing surface that is wider than the ground contact face, the hoof facing and ground contact faces being connected by the inner beveled edge and an outer beveled edge.

13. The horseshoe according to claim 12, further including: a portion extending from a peripheral edge of each of the heel portions, the extending portions being narrower than the heel portions.

14. The horseshoe according to claim 11, wherein the ground contact face is flat along the front central portion and defines a groove along each side branch portions, nail holes being defined in each groove.

15. The horseshoe according to claim 11, wherein the ground contact face is flat along the front central portion and further including transverse nail holes defined in the front central portion flat face, each transverse nail hole having a longer dimension extending transversely to the front central portion and a shorter dimension extending along to the front central portion, the shorter dimension corresponding to a width of a nail to be received in the transverse nail hole and the longer dimension being thicker than the nail, such that the nail can be positioned in a selectable location along the longer dimension.

16. The horseshoe according to claim 15, wherein the transverse nail hole includes notches defined along the longer dimension.

17. The horseshoe according to claim 15, wherein the transverse nail holes have a truncated pyramidal form.

18. The horseshoe according to claim 11, wherein the inner edge along the front central portion and the side branch portions is further beveled by a second chamfer in a direction of a hoof facing surface, a series of ridges or grooves being defined on the second chamfer along the front central portion.

19. The horseshoe according to claim 11, wherein the ridges or grooves extend transverse to the front central portion.

* * * * *